US012227386B2

(12) United States Patent
Park et al.

(10) Patent No.: US 12,227,386 B2
(45) Date of Patent: Feb. 18, 2025

(54) REPLACEABLE STACK SHEET

(71) Applicant: HYOSUNG TNS INC., Seoul (KR)

(72) Inventors: Jong Seong Park, Gyeonggi-do (KR); Ju Il Ahn, Seoul (KR); Hyun Sung Chung, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 195 days.

(21) Appl. No.: 17/969,807

(22) Filed: Oct. 20, 2022

(65) Prior Publication Data

US 2023/0136058 A1 May 4, 2023

(30) Foreign Application Priority Data

Oct. 28, 2021 (KR) ........................ 10-2021-0145798
Oct. 28, 2021 (KR) ........................ 10-2021-0145799

(51) Int. Cl.
*B65H 83/02* (2006.01)
*B65H 5/36* (2006.01)
*B65H 29/20* (2006.01)
*B65H 31/10* (2006.01)
(Continued)

(52) U.S. Cl.
CPC ............ *B65H 83/025* (2013.01); *B65H 5/36* (2013.01); *B65H 29/20* (2013.01); *B65H 31/10* (2013.01); *G07D 11/165* (2019.01); *G07F 19/202* (2013.01); *G07F 19/203* (2013.01); *B65H 2402/31* (2013.01); *B65H 2404/1114* (2013.01); *B65H 2601/324* (2013.01); *B65H 2601/61* (2013.01); *B65H 2701/1912* (2013.01); *G07D 2211/00* (2013.01)

(58) Field of Classification Search
CPC ...... B65H 2404/1114; B65H 2404/112; B65H 2404/1121; B65H 2404/113; B65H 2404/117; B65H 2404/12; B65H 2404/121; B65H 2404/122; B65H 29/40; G07D 11/165
See application file for complete search history.

(56) References Cited

U.S. PATENT DOCUMENTS 11,600,150 B2 * 3/2023 Oh ........................ G07D 11/16
2019/0304233 A1 10/2019 Nishida et al.
2021/0125465 A1 * 4/2021 Oh ........................ G07F 19/201

FOREIGN PATENT DOCUMENTS

CN 107381187 A 11/2017
EP 3 812 330 A1 4/2021
JP 4 75957 A 3/1992
(Continued)

OTHER PUBLICATIONS

Office Action dated Jun. 26, 2023 issued in corresponding Korean application No. KR 10-2021-0145799.
(Continued)

*Primary Examiner* — Jeremy R Severson
(74) *Attorney, Agent, or Firm* — BACON & THOMAS, PLLC

(57) ABSTRACT

A replaceable stack sheet replaceably provided in a medium integration/separation device to guide integration of a medium according to an embodiment includes a body which is coupled to a rotary shaft and in which a plurality of support shafts are spaced apart from each other in a circumferential direction, and a plurality of sheet pieces having ends rotatably coupled to the plurality of support shafts.

16 Claims, 17 Drawing Sheets

(51) Int. Cl.
*G07D 11/165* (2019.01)
*G07F 19/00* (2006.01)

(56) References Cited

FOREIGN PATENT DOCUMENTS

| | | | |
|---|---|---|---|
| JP | 2017134640 | A | 8/2017 |
| KR | 10-2005-0093693 | A | 9/2005 |
| KR | 2018 0075762 | A | 7/2018 |
| KR | 10-2021-0078905 | A | 6/2021 |

OTHER PUBLICATIONS

Office Action dated Mar. 23, 2023 issued in corresponding European application No. 22203897.8.
Office Action dated Mar. 14, 2023 issued in corresponding Russian application No. 2022126678.

* cited by examiner

[FIG.1]
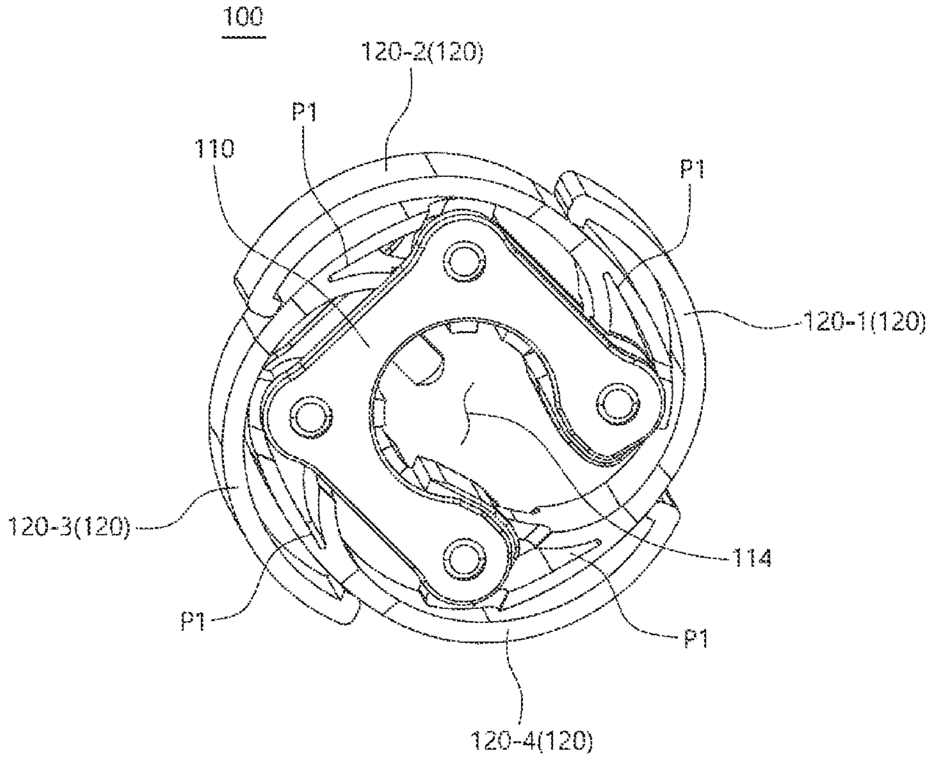

[FIG.2]
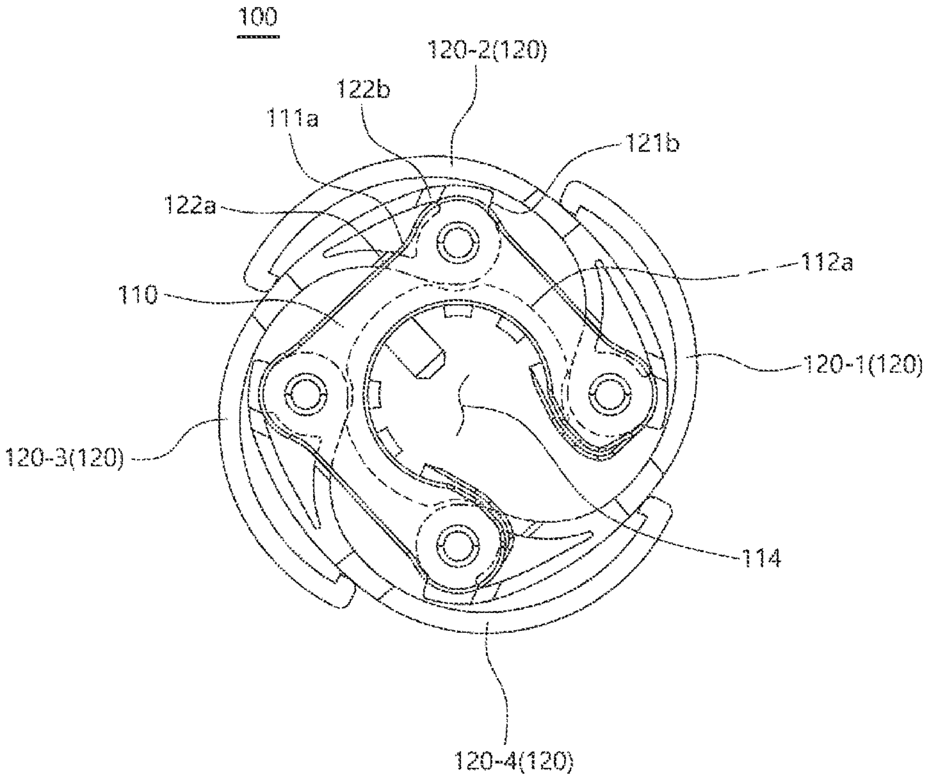

[FIG.3]
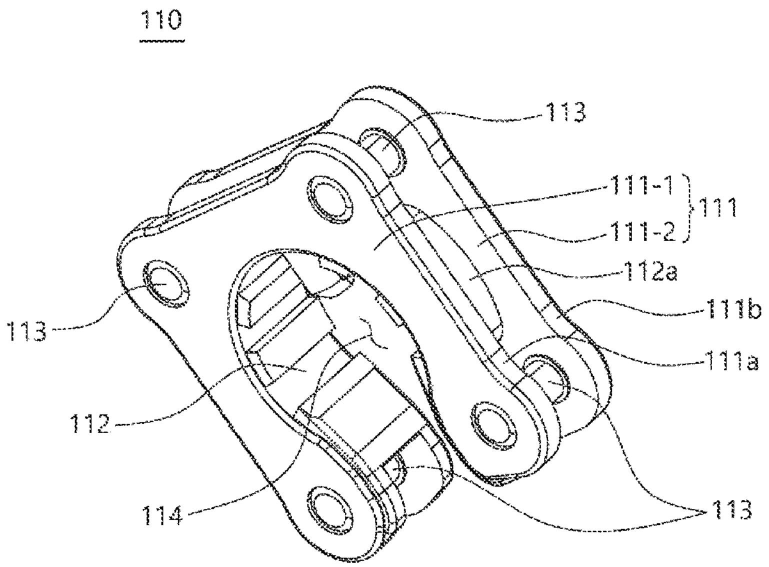

[FIG.4]
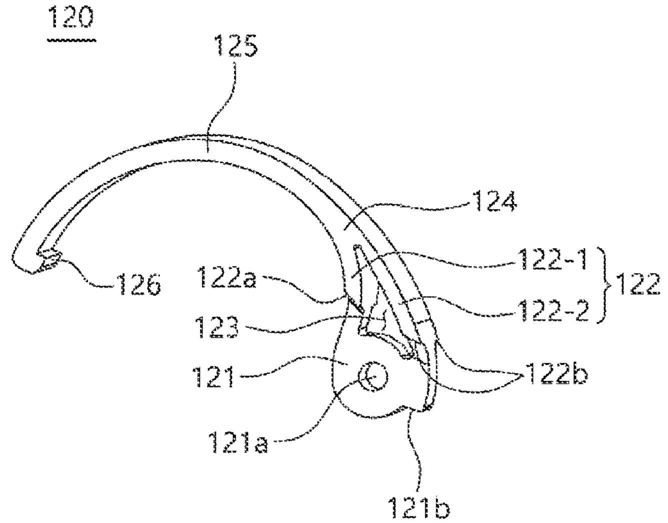
(a)
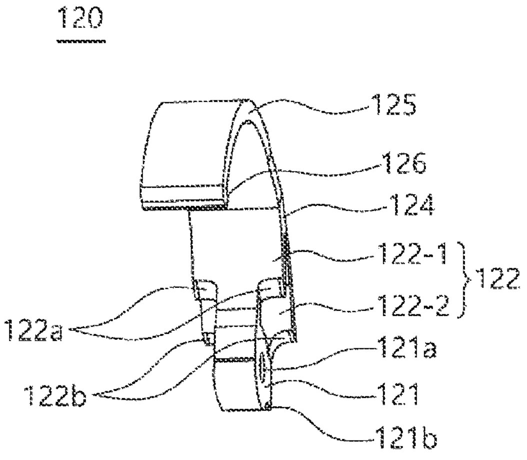
(b)

[FIG.5]
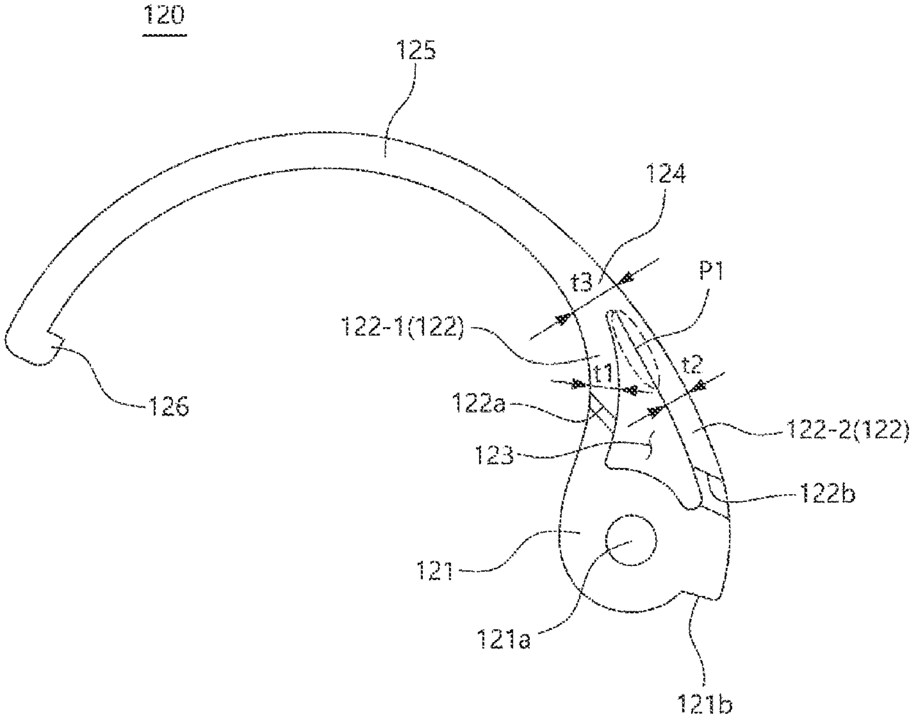

[FIG.6]
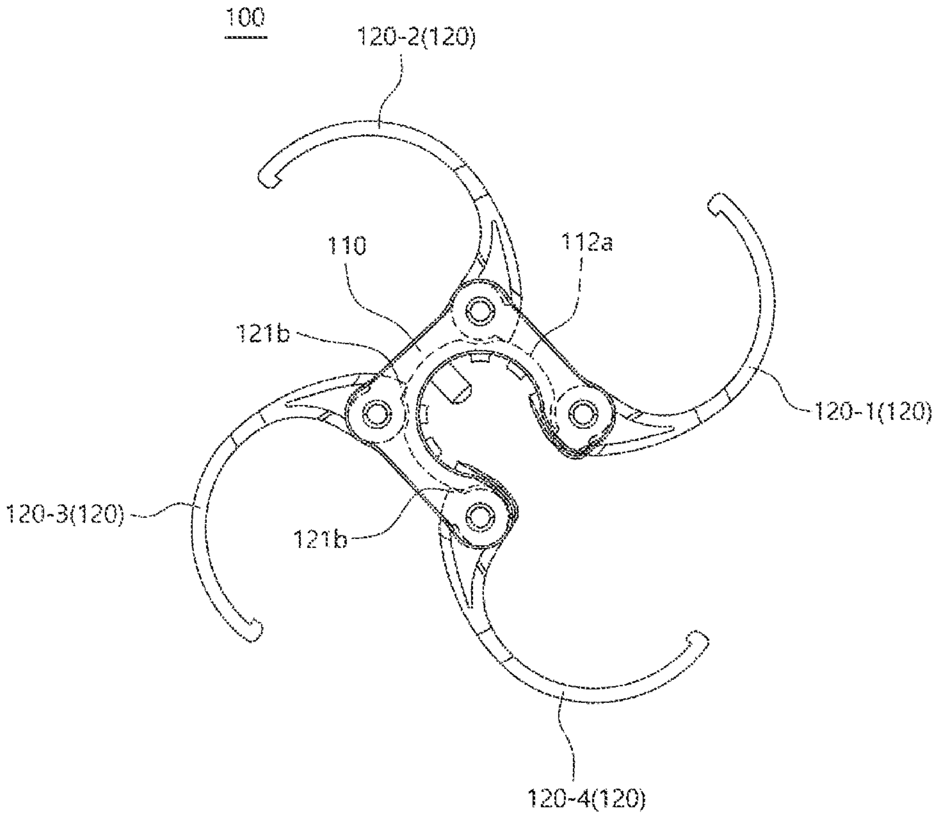

[FIG.7]
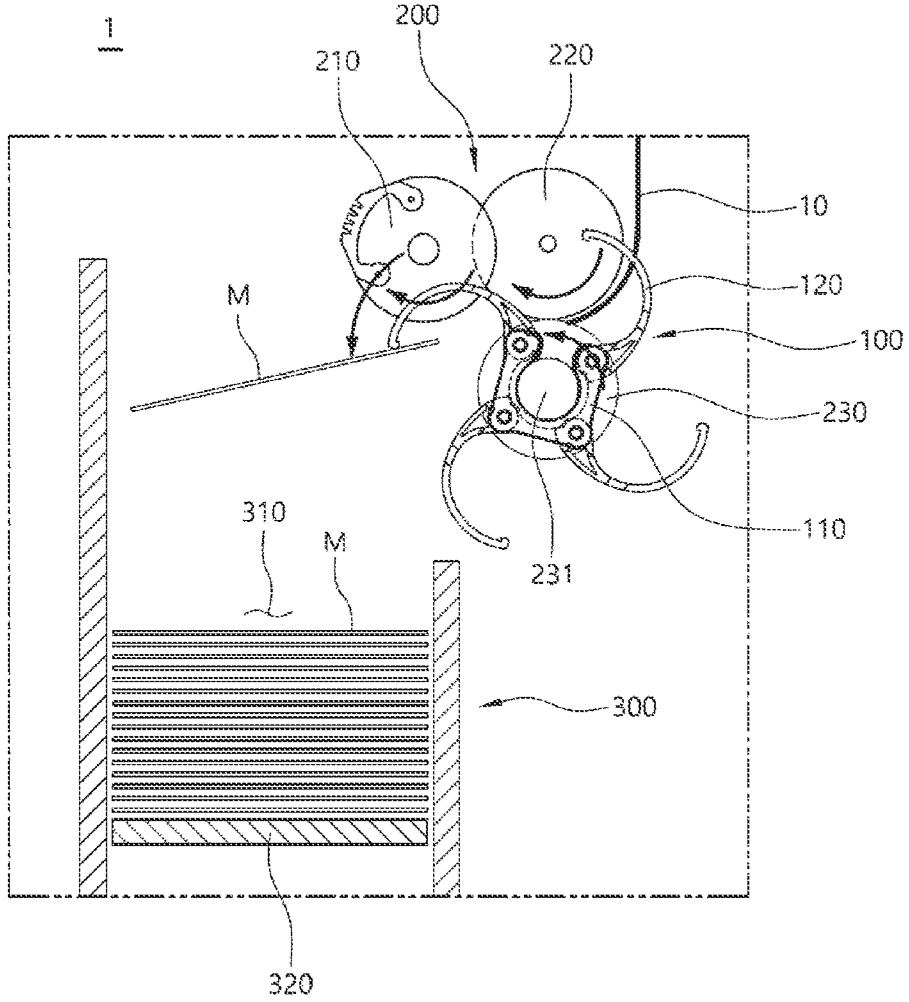

[FIG.8]
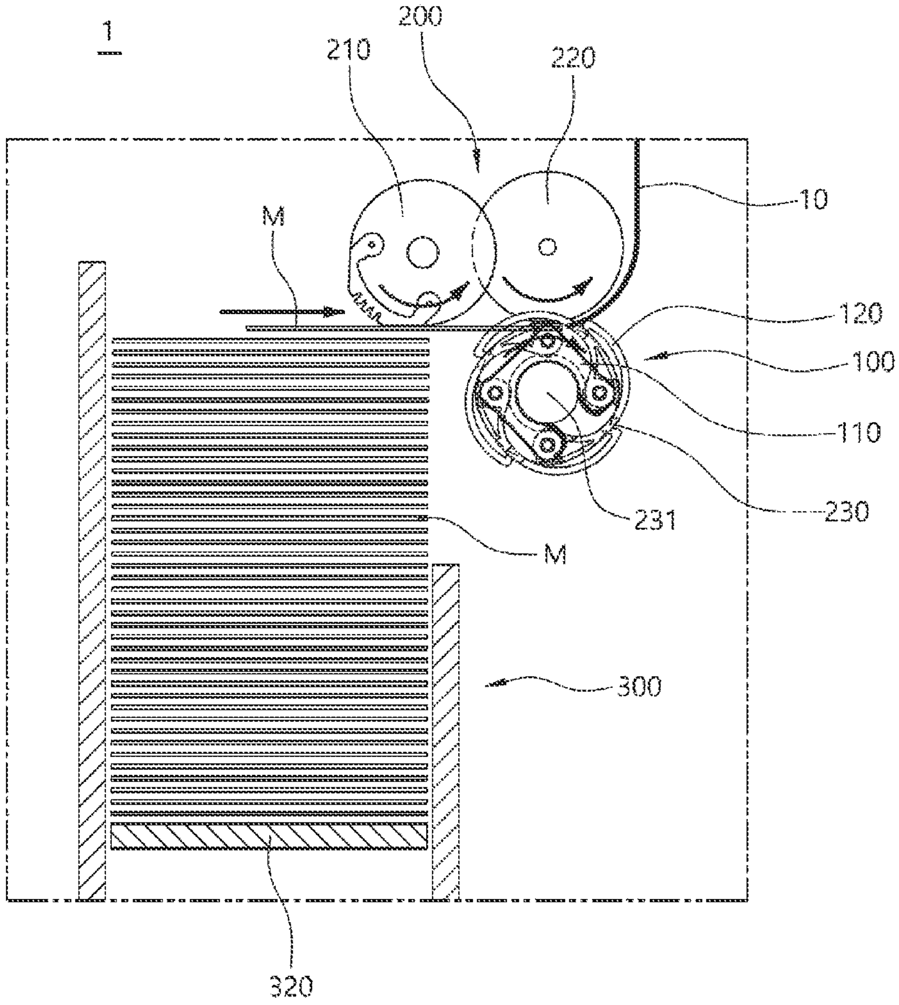

[FIG.9]
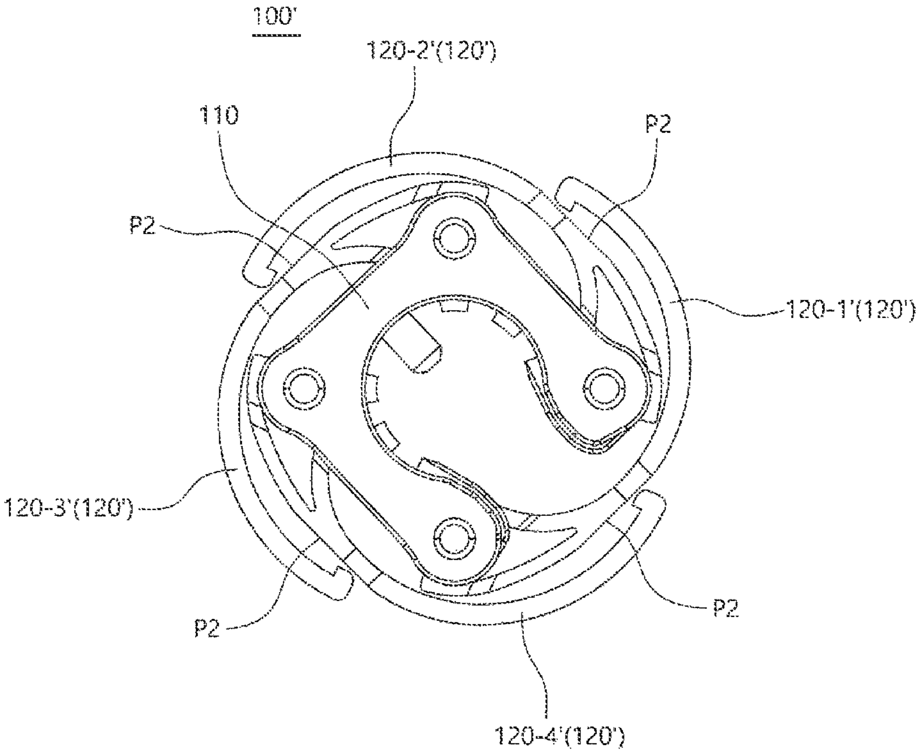

[FIG.10]
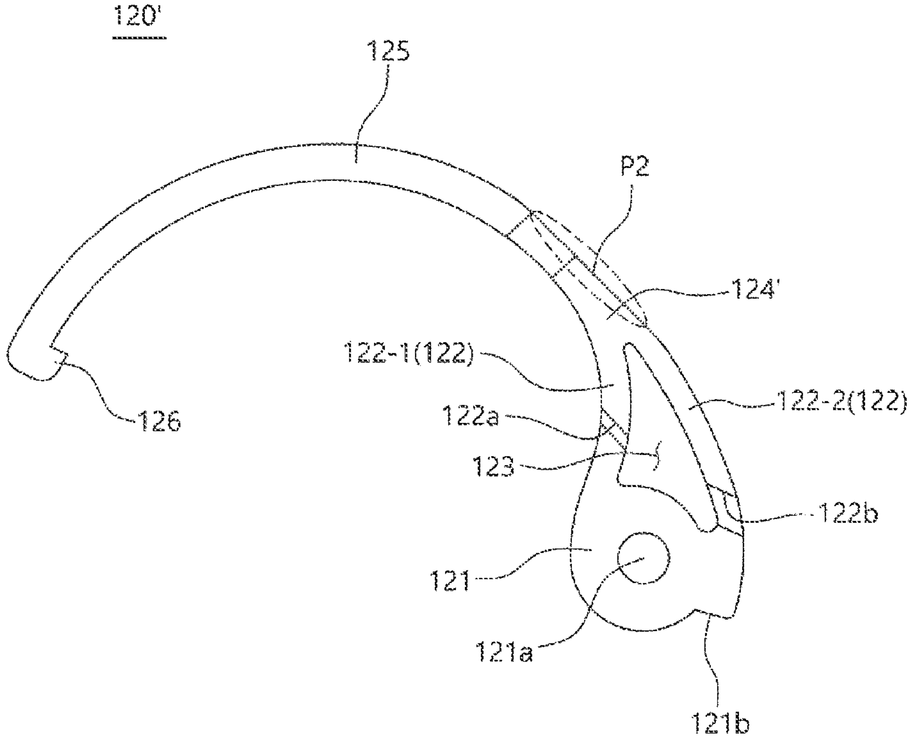

[FIG.11]
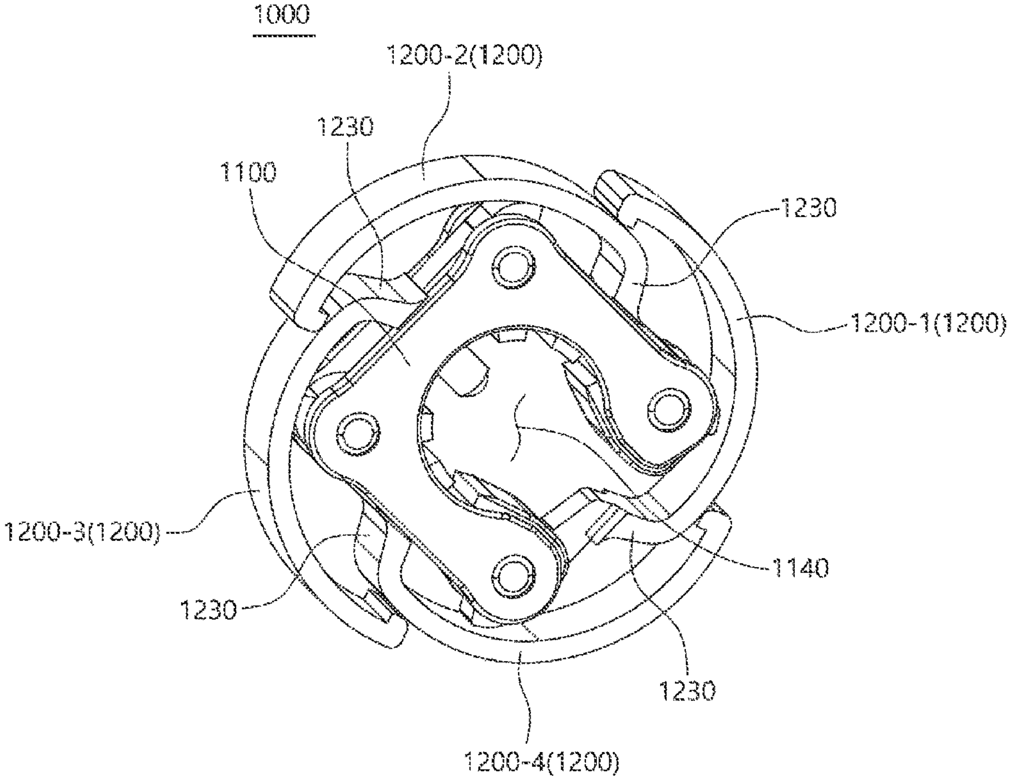

[FIG.12]
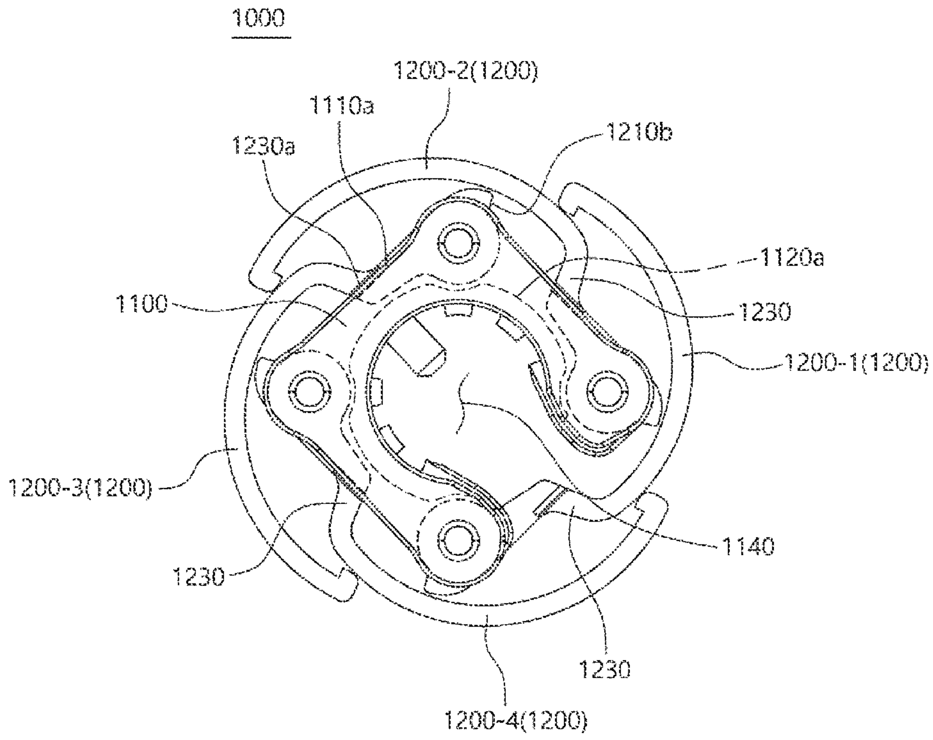

[FIG.13]
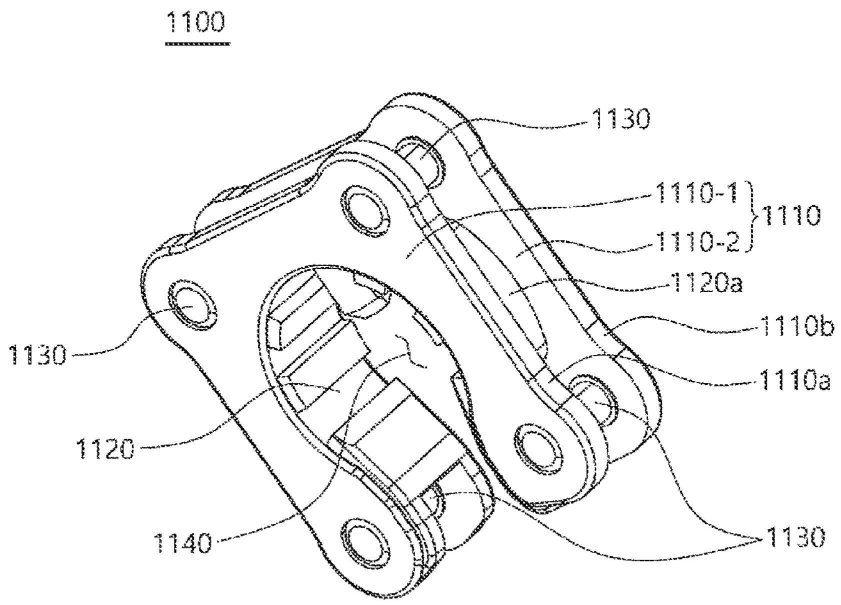

[FIG.14]
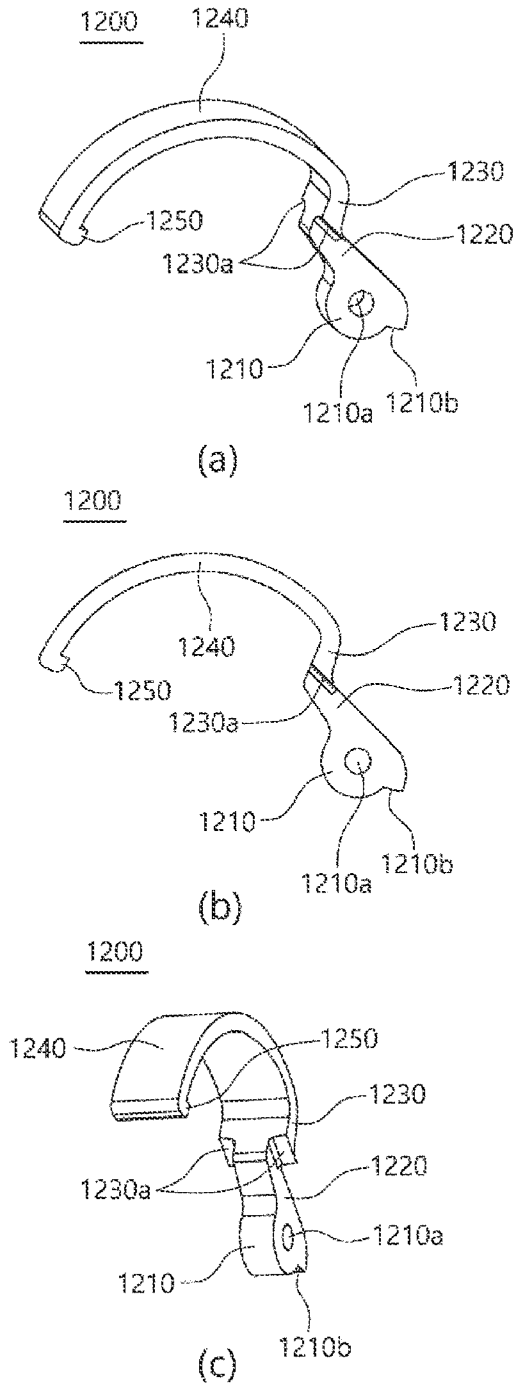

[FIG.15]
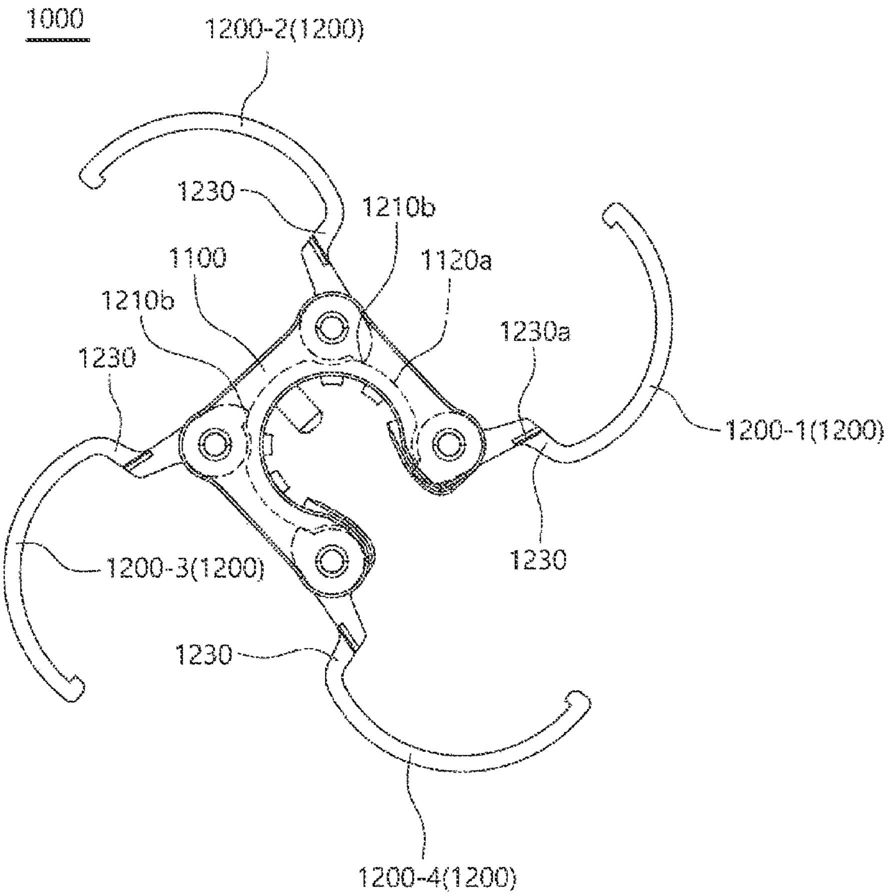

[FIG.16]
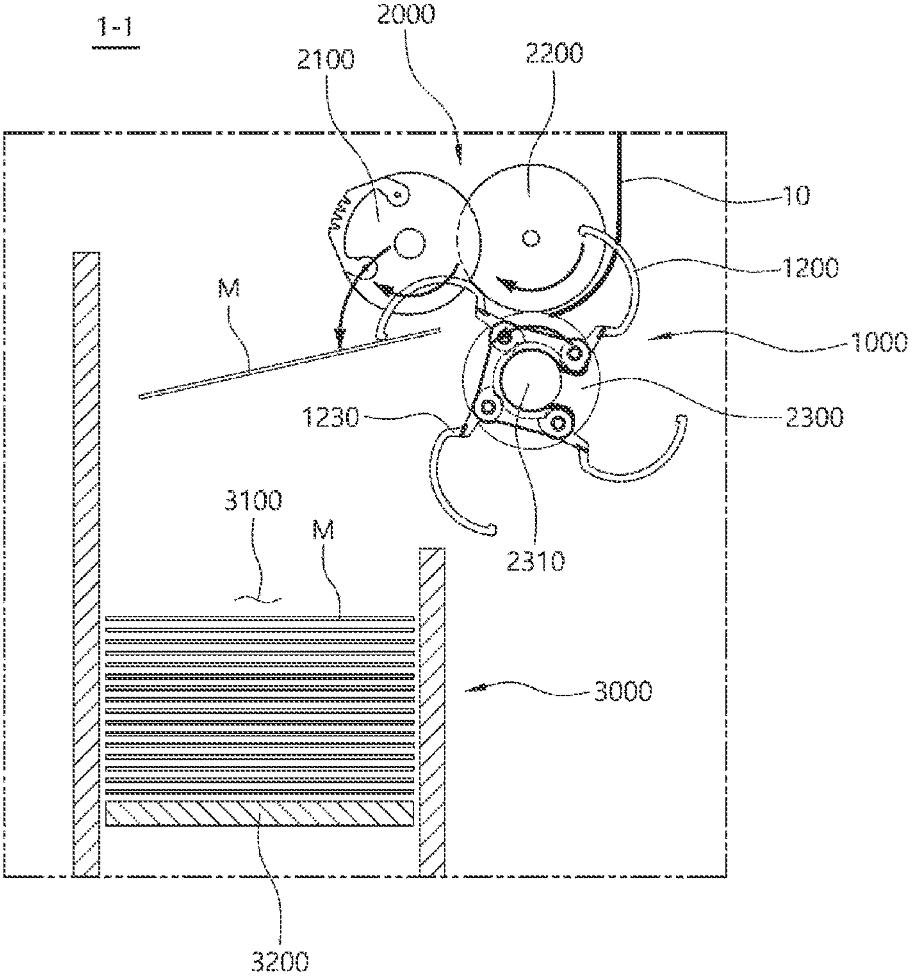

[FIG.17]
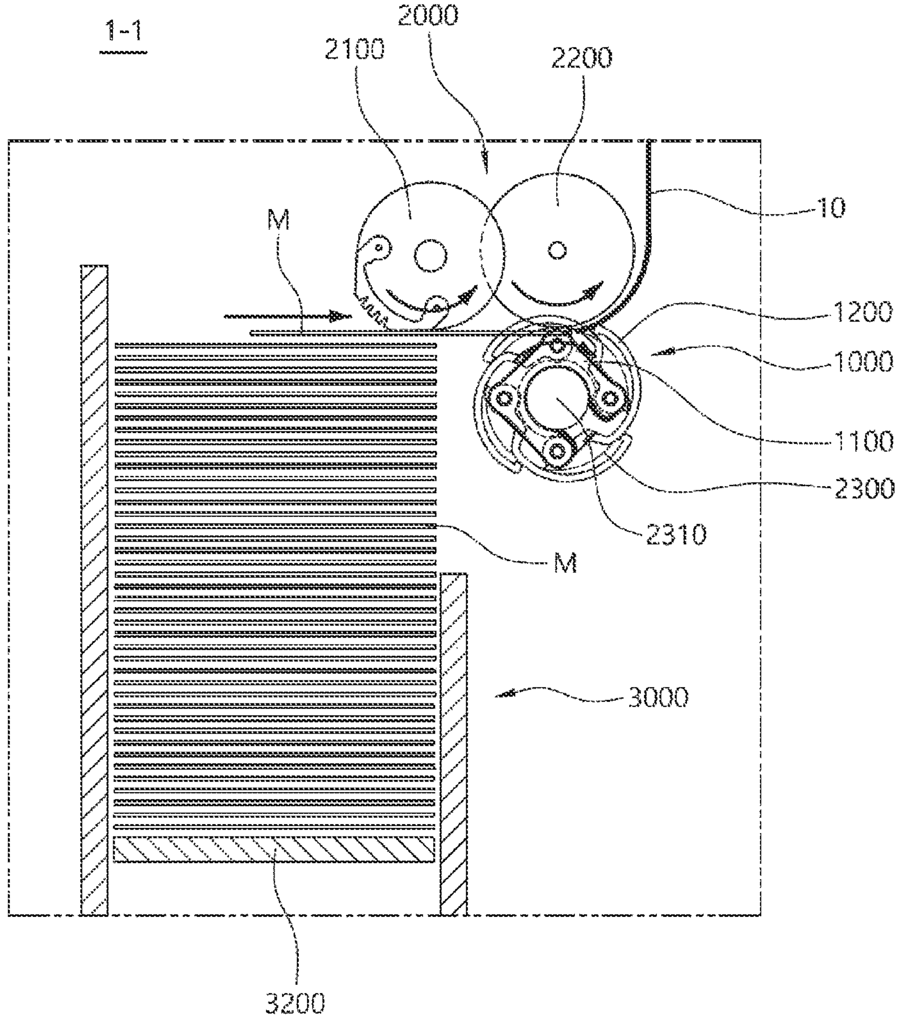

REPLACEABLE STACK SHEET

BACKGROUND

1. Field of the Invention

The present disclosure relates to a replaceable stack sheet, and more particularly, to a replaceable stack sheet that is replaceably provided in a medium integration/separation device to guide integration of medium.

2. Discussion of Related Art

In general, automated teller machines (ATMs) can provide convenient financial services to customers regardless of location and time at banks or other financial institutions. For example, ATMs may provide various financial services such as depositing or withdrawing media such as banknotes or checks or checking a balance and transferring money between accounts.

A medium storage unit of the ATM is provided with a medium integration/separation device for integrating a medium in the medium storage unit or separating the medium loaded in the medium storage unit one by one.

The medium integration/separation device may include a pick-up roller for separating the medium from the medium storage unit one by one, a feeding roller that is disposed adjacent to the pick-up roller to transport the medium separated by the pick-up roller onto a transport path or to integrate the medium transported along the transport path onto the medium storage unit, a guide roller for transporting the medium while overlapping the feeding roller, and a stack sheet in which a plurality of sheet pieces are formed on an outer circumferential surface.

When the medium is integrated, the stack sheet may be rotated by a driving unit, enter the transport path of the medium, and hit a rear end of the integrated medium, so that the medium may be evenly integrated in the medium storage unit.

However, in a stack sheet according to the related art, an excessive concentrated load is applied to a root portion of the stack sheet due to interference and collision with a counterpart such a power transmission shaft of the guide roller, a front plate mold, and an integrated banknote during rotation. Thus, when used for a certain period of time, the stack sheet is broken.

The related art related to the stack sheet according to the related art is disclosed in Korean Patent Laid-Open No. 10-2021-0049574.

SUMMARY OF THE INVENTION

The present disclosure is directed to providing a replaceable stack sheet which can distribute a concentrated load applied to a stack sheet to improve durability and maintain stack performance.

A replaceable stack sheet replaceably provided in a medium integration/separation device to guide integration of a medium according to the present disclosure includes a body which is coupled to a rotary shaft and in which a plurality of support shafts are spaced apart from each other in a circumferential direction, and a plurality of sheet pieces having ends rotatably coupled to the plurality of support shafts.

The plurality of sheet pieces each include a root part formed to extend from a coupling part to which the support shaft is coupled, and a hollow part is formed in the root part to distribute a concentrated load applied to the root part due to interference and collision with a counterpart when the rotary shaft rotates in an integration direction of the medium.

The root part includes a first root part having two strands of a first portion and a second portion on both sides of a position in which the hollow part is formed and a second root part formed in one strand at a position in which the hollow part is not formed and extending from the first root part.

Thicknesses of the first portion and the second portion of the first root part is smaller than a thickens of the second root part.

The first portion is positioned on a side facing a rotation direction when the medium is integrated, and the second portion is positioned on an opposite side to the rotation direction when the medium is integrated, and a first flat portion in which a portion of a side surface facing the hollow part has a flat shape is formed in the second portion.

A second flat portion having a partially flat shape is formed on one surface of the second root part positioned on an opposite side to a rotation direction when the medium is integrated.

The plurality of sheet pieces each include a sheet part extending from the root part in a curved surface and hitting a rear end of the integrated medium.

A protrusion for hitting the rear end of the medium in a downward direction when the medium is integrated is formed at a distal end of the sheet part.

The plurality of sheet pieces are unfolded outward from the body to guide integration of the medium when the rotary shaft is rotated in the integration direction of the medium and are folded on an outer surface of the body when the rotary shaft is rotated in a separation direction of the medium.

The rotary shaft is rotated in the separation direction of the medium, the plurality of sheet pieces are folded on the outer surface of the body while adjacent sheet pieces partially overlap each other in a radial direction.

A first catching step is formed at one end of the coupling part of the sheet piece, and a first catching part by which the first catching step is caught and which limits a rotation range of the sheet piece when the medium is integrated is formed in the body.

A second catching step and a third catching step are formed in the first portion and the second portion, and a first catching end on which the second catching step and the third catching step are seated and supported when the medium is separated is formed in the body.

The plurality of sheet pieces each include a root part formed to extend from a coupling part to which the support shaft is coupled, a bent part formed to be bent and extend at a predetermined angle toward an opposite side to a rotation direction when the medium is integrated in the root part, and a sheet part which is formed to be bent and extend at a predetermined angle in the rotation direction when the medium is integrated at an extension end of the bent part and hits a rear end of the integrated medium.

The bent part is formed at a position that interferes with a counterpart when the rotary shaft is rotated in the rotation direction when the medium is integrated, and reduces a concentrated load applied to the root part.

The plurality of sheet pieces are formed to extend from the root part in a curved shape.

A protrusion for hitting the rear end of the medium in a downward direction when the medium is integrated is formed at a distal end of the sheet part.

The plurality of sheet pieces are unfolded outward from the body to guide integration of the medium when the rotary shaft is rotated in the integration direction of the medium and are folded on an outer surface of the body when the rotary shaft is rotated in a separation direction of the medium.

When the rotary shaft is rotated in the separation direction of the medium, the plurality of sheet pieces are folded on the outer surface of the body while adjacent sheet pieces partially overlap each other in a radial direction.

A fourth catching step is formed at one end of the coupling part of the sheet piece, and a second catching part by which the fourth catching step is caught and which limits a rotation range of the sheet piece when the medium is integrated is formed in the body.

A fifth catching step is formed in the bent part, and a second catching end on which the fifth catching step is seated and supported when the medium is separated is formed in the body.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view illustrating a replaceable stack sheet according to a first embodiment of the present disclosure;

FIG. 2 is a front view illustrating the replaceable stack sheet according to the first embodiment of the present disclosure;

FIG. 3 is a perspective view illustrating a body constituting the replaceable stack sheet according to the first embodiment of the present disclosure;

FIG. 4 is a view illustrating a sheet piece constituting the replaceable stack sheet according to the first embodiment of the present disclosure when viewed in different directions;

FIG. 5 is a front view illustrating the sheet piece constituting the replaceable stack sheet according to the first embodiment of the present disclosure;

FIG. 6 is a front view illustrating a state in which the sheet piece of the replaceable stack sheet according to the first embodiment of the present disclosure is unfolded;

FIG. 7 is an operation state diagram illustrating a state in which a medium integrated in a medium integration/separation device including the replaceable stack sheet according to the first embodiment of the present disclosure;

FIG. 8 is an operation state diagram illustrating a state in which the medium is separated in the medium integration/separation device including the replaceable stack sheet according to the first embodiment of the present disclosure;

FIG. 9 is a front view illustrating a replaceable stack sheet according to a second embodiment of the present disclosure;

FIG. 10 is a front illustrating a sheet piece constituting the replaceable stack sheet according to the second embodiment of the present disclosure;

FIG. 11 is a perspective view illustrating a replaceable stack sheet according to a third embodiment of the present disclosure;

FIG. 12 is a front view illustrating the replaceable stack sheet according to the third embodiment of the present disclosure;

FIG. 13 is a perspective view illustrating a body constituting the replaceable stack sheet according to the third embodiment of the present disclosure;

FIG. 14 is a view illustrating a sheet piece constituting the replaceable stack sheet according to the third embodiment of the present disclosure when viewed in different directions;

FIG. 15 is a front view illustrating a state in which the sheet piece of the replaceable stack sheet according to the third embodiment of the present disclosure is unfolded;

FIG. 16 is an operation state diagram illustrating a state in which a medium is integrated in a medium integration/separation device including the replaceable stack sheet according to the third embodiment of the present disclosure; and FIG. 17 is an operation state diagram illustrating a state in which the medium is separated in the medium integration/separation device including the replaceable stack sheet according to the third embodiment of the present disclosure.

DETAILED DESCRIPTION OF EXEMPLARY EMBODIMENTS

Hereinafter, configurations and operations of exemplary embodiments of the present disclosure will be described in detail with reference to the accompanying drawings.

Referring to FIGS. 1 to 8, a replaceable stack sheet 100 according to a first embodiment of the present disclosure includes a body 110 which is coupled to a rotary shaft 231 of a medium integration/separation device 1 and in which a plurality of support shafts 113 are spaced apart from each other in a circumferential direction, and a plurality of sheet pieces 120; 120-1, 120-2, 120-3, and 120-4 having ends rotatably coupled to the plurality of support shafts 113.

Referring to FIGS. 2 and 3, the body 110 includes a pair of support plates 111; 111-1 and 111-2 which are spaced apart from each other in a front-rear direction, are arranged in parallel to each other, and have a rotary shaft coupling hole 114 formed in a center thereof to which a rotary shaft 231 (see FIG. 8) is coupled, a connection support part 112 that interconnects the pair of support plates 111; 111-1 and 111-2, and the plurality of support shafts 113 coupled to pass through edge portions of the pair of support plates 111; 111-1 and 111-2 in a front-rear direction.

A first catching part 112*a* by which a first catching step 121*b* formed in the sheet piece 120, which will be described below, is caught are formed at edges of the pair of support plates 111; 111-1 and 111-2.

As illustrated in FIG. 7, the first catching step 121*b* and the first catching part 112*a* function as a stopper for limiting an angle at which the sheet piece 120 is unfolded and rotated when the stack sheet 100 is rotated in an integration direction of the medium.

First catching ends 111*a* and 111*b* on which a second catching step 122*a* and a third catching step 122*b* formed in the sheet piece 120, which will be described below, are seated and supported is formed on an outer surface of the connection support part 112.

As illustrated in FIG. 8, when the stack sheet 100 rotates in a separation direction of a medium, the second catching step 122*a* and the third catching step 122*b* may be seated and supported on the first catching ends 111*a* and 111*b*, and the plurality of sheet pieces 120; 120-1, 120-2, 120-3, and 120-4 may be folded on an outer surface of the body 110 while adjacent sheet pieces partially overlap each other in a radial direction.

Referring to FIG. 4, the sheet piece 120 includes a coupling part 121, root parts 122 and 124, and a sheet part 125.

The coupling part 121 is a part to which the support shaft 113 is coupled, a support shaft through-hole 121*a* is formed in a center of the coupling part 121, and the first catching step 121*b* is formed at a lower end of one side of the coupling part 121.

The root parts 122 and 124 are parts extending from the coupling part 121 and supporting the sheet part 125 and include a first root part 122 formed at a portion adjacent to the coupling part 121 and a second root part 124 extending from the first root part 122 and connected to the sheet part 125.

A hollow part 123 is formed inside the root parts 122 and 124 to distribute a concentrated load applied to the root parts 122 and 124 due to interference and collision with a power transmission shaft of a guide roller, a front plate mold, and an integrated banknote (hereinafter, referred to as a "counterpart") when the rotary shaft 231 rotates in an integration direction of a medium M.

The root parts 122 and 124 include the root part 122 having two strands of a first portion 122-1 and a second portion 122-2 on both sides of a position in which the hollow part 123 is formed and the second root part 124 formed in one strand at a position in which the hollow part 123 is not formed and extending from the first root part 122.

Referring to FIG. 5, thicknesses t1 and t2 of the first portion 122-1 and the second portion 122-2 of the first root part 122 are thinner than a thickness t3 of the second root part 124. According to this configuration, when the stack sheet 100 rotates in the integration direction of the medium, when the concentrated load is applied to the root parts 122 and 124 due to the interference and collision with the counterpart, since the concentrated load is distributed to the first portion 122-1 and the second portion 122-2 having the thicknesses t1 and t2 that are relatively smaller than the thickness t3 of the second root part 124, a damage to the first root part 122 due to the concentrated load can be prevented, and thus the durability of the sheet piece 120 can be improved.

Further, when the medium M is integrated, the first portion 122-1 and the second portion 122-2 of the first root part 122 serve to push the medium M together, and thus the integration performance of the medium M can be maintained at the same level as when the first root part 122 is thickly formed as one strand.

The first portion 122-1 is positioned on a side facing a rotation direction when the medium M is integrated, the second portion 122-2 is positioned on a side opposite to the rotation direction when the medium M is integrated, and a first flat portion P1 in which a portion of a side surface facing the hollow part 123 has a flat shape is formed in the second portion 122-2.

In this way, the first flat portion P1 is formed in a portion of the second portion 122-2, the thickness of the second portion 122-2 at a position in which the first flat portion P1 is formed becomes thinner, and thus the concentrated load applied to the second portion 122-2 can be further alleviated.

The sheet part 125 is formed to extend from the root parts 122 and 124 in a curved shape and functions to guide the integration of the medium M by hitting a rear end of the integrated medium M.

In this way, the sheet part 125 is formed in a curved shape rather than a flat shape. Thus, when the medium M is integrated, a rear end of the medium M may be hit downward, so that the medium M can be more stably integrated. When the medium M is separated, the plurality of sheet pieces 120; 120-1, 120-2, 120-3, and 120-4 are folded on the outer surface of the body 110 while partially overlapping each other, so that interference with the separated medium M can be prevented.

A protrusion 126 for hitting a rear end of the medium M in a downward direction when the medium M is integrated may be formed at a rear end of the sheet part 125. The protrusion 126 is formed in a shape bent at a predetermined angle from the rear end of the sheet part 125 to press the rear end of the integrated medium M in the downward direction so as to perform a function in which the medium M can be integrated more stably.

Referring to FIGS. 6 and 7, when the rotary shaft 231 is rotated in the integration direction of the medium M, the plurality of sheet pieces 120 are unfolded outward from the body 110 to guide the integration of the medium M.

Referring to FIG. 8, when the rotary shaft 231 is rotated in the separation direction of the medium M, the plurality of sheet pieces 120 are folded on the outer surface of the body 110 while adjacent sheet pieces partially overlap each other in the radial direction.

Referring to FIGS. 7 and 8, the medium integration/separation device 1 including the replaceable stack sheet 100 according to the first embodiment of the present disclosure includes the replaceable stack sheet 100, an integration/separation unit 200, and a medium storage unit 300.

The integration/separation unit 200 is provided on one side of an upper portion of the medium storage unit 300 to function to integrate the medium M transported along a transport path 10 in the medium storage unit 300 or transport the medium M separated one by one from the medium storage unit 300 to the transport path 10.

The integration/separation unit 200 includes a pickup roller 210 that separates the medium M in units of sheets, a feed roller 220 that is disposed adjacent to the pickup roller 210 in transport the medium M separated by the pickup roller 210 to the transport path 10 or integrate the medium M transported along the transport path 10 to the medium storage unit 300, and a guide roller 230 for transporting the medium M while overlapping the feed roller 220.

The stack sheet 100 and the guide roller 230 are coupled to the same rotary shaft 231.

A medium integration space 310 is provided inside the medium storage unit 300, and a push plate 320 supporting the integrated medium M and vertically moving is provided in the medium integration space 310.

Referring to FIGS. 9 and 10, a replaceable stack sheet 100' according to a second embodiment of the present disclosure has the same overall configuration as the above-described embodiment and is different from the above-described embodiment in terms of partial forms of sheet pieces 120'; 120-1', 120-2', 120-3', and 120-4' being transformed.

In the present embodiment, a second flat portion P2 having a partially flat shape is formed on one surface of the second root part 124 positioned on an opposite side to the rotation direction when the medium M is integrated.

In this way, as the second flat portion P2 is formed on the one surface of the second root part 124, the thickness of the second root part 124 at a position in which the second flat portion P2 is formed is formed thinner, and thus the concentrated load applied to the second root part 124 can be further alleviated.

Hereinafter, a configuration of a replaceable stack sheet 1000 according to a third embodiment of the present disclosure will be described. Referring to FIGS. 11 to 17, a replaceable stack sheet 1000 according to a third embodiment of the present disclosure includes a body 1100 which is coupled to a rotary shaft 2310 of a medium integration/separation device 1-1 and in which a plurality of support shafts 1130 are spaced apart from each other in a circumferential direction, and a plurality of sheet pieces 1200;

1200-1, 1200-2, 1200-3, and 1200-4 having ends rotatably coupled to the plurality of support shafts 1130.

Referring to FIGS. 12 and 13, the body 1100 includes a pair of support plates 1110; 1110-1 and 1110-2 which are spaced apart from each other in a front-rear direction, are arranged in parallel to each other, and have a rotary shaft coupling hole 1140 formed in a center thereof to which a rotary shaft 2310 (see FIG. 16) is coupled, a connection support part 1120 that interconnects the pair of support plates 1110; 1110-1 and 1110-2, and the plurality of support shafts 1130 coupled to pass through edge portions of the pair of support plates 1110; 1110-1 and 1110-2 in a front-rear direction.

A second catching part 1120*a* by which a fourth catching step 1210*b* formed in the sheet piece 1200, which will be described below, is caught are formed at edges of the pair of support plates 1110; 1110-1 and 1110-2.

As illustrated in FIG. 16, the fourth catching step 1210*b* and the second catching part 1120*a* function as a stopper for limiting an angle at which the sheet piece 1200 is unfolded and rotated when the stack sheet 1000 is rotated in an integration direction of the medium.

Second catching ends 1110*a* and 1110*b* on which a fifth catching step 1230*a* formed in the sheet piece 1200, which will be described below, is seated and supported is formed on an outer surface of the connection support part 1120.

As illustrated in FIG. 17, when the stack sheet 1000 rotates in the separation direction of the medium, the fifth catching step 1230*a* may be seated and supported on the Second catching ends 1110*a* and 1110*b*, and the plurality of sheet pieces 1200; 1200-1, 1200-2, 1200-3, and 1200-4 may be folded on an outer surface of the body 1100 while adjacent sheet pieces partially overlap each other in the radial direction.

Referring to FIG. 14, the sheet piece 1200 includes a coupling part 1210, a root part 1220, a bent part 1230, and a sheet part 1240.

The coupling part 1210 is a part to which the support shaft 1130 is coupled, a support shaft through-hole 1210*a* is formed in a center of the coupling part 1210, and the fourth catching step 1210*b* is formed at a lower end of one side of the coupling part 1210.

The root part 1220 is a part extending from the coupling part 1210 and supporting the bent part 1230 and the sheet part 1240.

The bent part 1230 is formed to be bent and extend at a predetermined angle toward an opposite side to the rotation direction when the medium M is integrated in the root part 1220.

When the rotary shaft 2310 is rotated in the rotation direction when the medium M is integrated, the bent part 1230 is formed at a position that interferes with a power transmission shaft of a guide roller, a front plate mold, and an integrated banknote (hereinafter, referred to as a "counterpart") to function to reduce the concentrated load applied to the root part 1220.

That is, when it is assumed that a portion in which the bent part 1230 is not formed and the sheet part 1240 is connected to the root part 1220 is formed in a planar shape, when the stack sheet 100 is rotated in the integration direction of the medium M, the root part 1220 and the sheet part 1240 are bent in an opposite direction to the integration direction of the medium M due to interference and collision with the counterpart, a large concentrated load is applied to the root part 1220, and thus the root part 1220 may be damaged.

In contrast, as in the present embodiment, as the bent part 1230 is formed at a portion in which the root part 1220 and the sheet part 1240 are connected, when the stack sheet 100 is rotated in the integration direction of the medium M, even when the stack sheet 1000 interferes or collides with the counterpart, the amount of deformation in which the bent part 1230 is bent is greatly reduced. Thus, the concentrated load applied to the root part 1220 can be significantly reduced, so that the root part 1220 cart be effectively prevented from being damaged.

The sheet part 1240 is bent at a predetermined angle toward the rotation direction when the medium M is integrated at an extension end of the bent part 1230, extends in a curved shape, and hits the rear end of the medium M, thereby serving to guide the integration of the medium M.

In this way, the sheet part 1240 is formed in a curved shape rather than a flat shape. Thus, when the medium M is integrated, a rear end of the medium M may be hit downward, so that the medium M can be more stably integrated. When the medium M is separated, the plurality of sheet pieces 1200; 1200-1, 1200-2, 1200-3, and 1200-4 are folded on the outer surface of the body 1100 while partially overlapping each other, so that interference with the separated medium M can be prevented.

A protrusion 1250 for hitting the rear end of the medium M in the downward direction when the medium M is integrated may be formed at a rear end of the sheet part 1240. The protrusion 1250 is formed in a shape bent at a predetermined angle from the rear end of the sheet part 1240 to press the rear end of the integrated medium M in the downward direction so as to perform a function in which the medium M can be integrated more stably.

Referring to FIGS. 15 and 16, when the rotary shaft 2310 is rotated in the integration direction of the medium M, the plurality of sheet pieces 1200 are unfolded outward from the body 1100 to guide the integration of the medium M.

Referring to FIG. 17, when the rotary shaft 2310 is rotated in the separation direction of the medium M, the plurality of sheet pieces 1200 are folded on the outer surface of the body 1100 while adjacent sheet pieces partially overlap each other in the radial direction.

Referring to FIGS. 16 and 17, the medium integration/separation device 14 including the replaceable stack sheet 1000 according to the third embodiment of the present disclosure includes the replaceable stack sheet 1000, an integration/separation unit 2000, and a medium storage unit 3000.

The integration/separation unit 2000 is provided on one side of an upper portion of the medium storage unit 3000 to function to integrate the medium M transported along the transport path 10 in the medium storage unit 3000 or transport the medium M separated one by one from the medium storage unit 3000 to the transport path 10.

The integration/separation unit 2000 includes a pickup roller 2100 that separates the medium M in units of sheets, a feed roller 2200 that is disposed adjacent to the pickup roller 2100 to transport the medium M separated by the pickup roller 2100 in the transport path 10 or integrate the medium M transported along the transport path 10 to the medium storage unit 3000, and a guide roller 2300 for transporting the medium M while overlapping the feed roller 2200.

The stack sheet 1000 and the guide roller 2300 are coupled to the same rotary shaft 2310. A medium integration space 3100 is provided inside the medium storage unit 3000, and a push plate 3200 supporting the integrated medium M and vertically moving is provided in the medium integration space 3100.

According to a replaceable stack sheet according to a first embodiment and a second embodiment of the present disclosure, a hollow part is formed in a root part of the stack sheet, a concentrated load applied to the root part due to interference with a counterpart when the stack sheet rotates is distributed to the root part formed in two strands on both sides of the hollow part, and thus the durability of the stack sheet can be improved, and the stack performance cart be maintained.

According to a replaceable stack sheet according to a third embodiment of the present disclosure, a bent part is formed between a root part and a sheet part of the stack sheet, a concentrated load applied to the root part due to interference with a counterpart when the stack sheet rotates is reduced, and thus the durability of the stack sheet can be improved, and the stack performance can be maintained.

As described above, the present disclosure is not limited to the above-described embodiments, obvious modifications could be made by those skilled in the art to which the present disclosure pertains without departing from the technical spirit of the present disclosure claimed by the appended claims, and the obvious modifications belong to the scope of the present disclosure.

What is claimed is:

1. A replaceable stack sheet replaceably provided in a medium integration/separation device to guide integration of a medium, the stack sheet comprising:

a body which is coupled to a rotary shaft and in which a plurality of support shafts are spaced apart from each other in a circumferential direction; and a plurality of sheet pieces having ends rotatably coupled to the plurality of support shafts;

wherein the plurality of sheet pieces each include a root part formed to extend from a coupling part to which the support shaft is coupled, and a hollow part is formed in the root part to distribute a concentrated load applied to the root part due to interference and collision with a counterpart when the rotary shaft rotates in an integration direction of the medium, wherein the root part includes a first root part having two strands of a first portion and a second portion on both sides of a position in which the hollow part is formed and a second root part formed in one strand at a position in which the hollow part is not formed and extending from the first root part, wherein thicknesses of the first portion and the second portion of the first root part is smaller than a thickness of the second root part.

2. The replaceable stack sheet of claim 1, wherein the plurality of sheet pieces each include a sheet part extending from the root part in a curved surface and hitting a rear end of the integrated medium.

3. The replaceable stack sheet of claim 2, wherein a protrusion for hitting the rear end of the medium in a downward direction when the medium is integrated is formed at a distal end of the sheet part.

4. The replaceable stack sheet of claim 1, wherein the plurality of sheet pieces are unfolded outward from the body to guide integration of the medium when the rotary shaft is rotated in the integration direction of the medium and are folded on an outer surface of the body when the rotary shaft is rotated in a separation direction of the medium.

5. The replaceable stack sheet of claim 4, wherein, when the rotary shaft is rotated in the separation direction of the medium, the plurality of sheet pieces are folded on the outer surface of the body while adjacent sheet pieces partially overlap each other in a radial direction.

6. The replaceable stack sheet of claim 1, wherein a first catching step is formed at one end of the coupling part of the sheet piece, and a first catching part by which the first catching step is caught and which limits a rotation range of the sheet piece when the medium is integrated is formed in the body.

7. The replaceable stack sheet of claim 1, wherein a second catching step and a third catching step are formed in the first portion and the second portion, and a first catching end on which the second catching step and the third catching step are seated and supported when the medium is separated is formed in the body.

8. A replaceable stack sheet replaceably provided in a medium integration/separation device to guide integration of a medium, the stack sheet comprising:

a body which is coupled to a rotary shaft and in which a plurality of support shafts are spaced apart from each other in a circumferential direction; and a plurality of sheet pieces having ends rotatably coupled to the plurality of support shafts;

wherein the plurality of sheet pieces each include a root part formed to extend from a coupling part to which the support shaft is coupled, and a hollow part is formed in the root part to distribute a concentrated load applied to the root part due to interference and collision with a counterpart when the rotary shaft rotates in an integration direction of the medium, wherein the root part includes a first root part having two strands of a first portion and a second portion on both sides of a position in which the hollow part is formed and a second root part formed in one strand at a position in which the hollow part is not formed and extending from the first root part, wherein the first portion is positioned on a side facing a rotation direction when the medium is integrated, and the second portion is positioned on an opposite side to the rotation direction when the medium is integrated, and a first flat portion in which a portion of a side surface facing the hollow part has a flat shape is formed in the second portion.

9. The replaceable stack sheet of claim 8, wherein a second flat portion having a partially flat shape is formed on one surface of the second root part positioned on an opposite side to a rotation direction when the medium is integrated.

10. A replaceable stack sheet replaceably provided in a medium integration/separation device to guide integration of a medium, the stack sheet comprising:

a body which is coupled to a rotary shaft and in which a plurality of support shafts are spaced apart from each other in a circumferential direction; and a plurality of sheet pieces having ends rotatably coupled to the plurality of support shafts;

wherein the plurality of sheet pieces each include a root part formed to extend from a coupling part to which the support shaft is coupled, a bent part formed to be bent and extend at a predetermined angle toward an opposite side to a rotation direction when the medium is integrated in the root part, and a sheet part which is formed to be bent and extend at a predetermined angle in the rotation direction when the medium is integrated at an extension end of the bent part and hits a rear end of the integrated medium, wherein a fifth catching step is formed in the bent part, and a second catching end on which the fifth catching step is seated and supported when the medium is separated is formed in the body.

11. The replaceable stack sheet of claim 10, wherein the bent part is formed at a position that interferes with a counterpart when the rotary shaft is rotated in the rotation direction when the medium is integrated, and reduces a concentrated load applied to the root part.

12. The replaceable stack sheet of claim 10, wherein the plurality of sheet pieces are formed to extend from the root part in a curved shape.

13. The replaceable stack sheet of claim 12, wherein a protrusion for hitting the rear end of the medium in a downward direction when the medium is integrated is formed at a distal end of the sheet part.

14. The replaceable stack sheet of claim 10, wherein the plurality of sheet pieces are unfolded outward from the body to guide integration of the medium when the rotary shaft is rotated in the integration direction of the medium and are folded on an outer surface of the body when the rotary shaft is rotated in a separation direction of the medium.

15. The replaceable stack sheet of claim 14, wherein, when the rotary shaft is rotated in the separation direction of the medium, the plurality of sheet pieces are folded on the outer surface of the body while adjacent sheet pieces partially overlap each other in a radial direction.

16. The replaceable stack sheet of claim 10, wherein a fourth catching step is formed at one end of the coupling part of the sheet piece, and a second catching part by which the fourth catching step is caught and which limits a rotation range of the sheet piece when the medium is integrated is formed in the body.

* * * * *